Patented Aug. 9, 1938

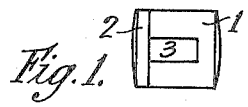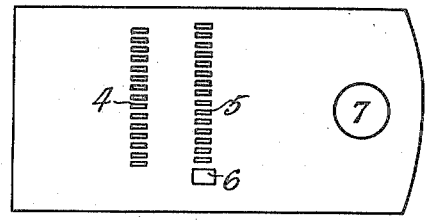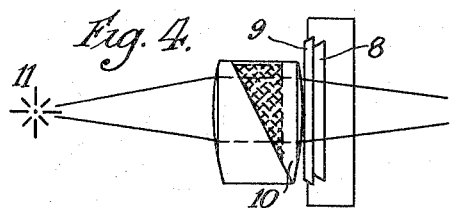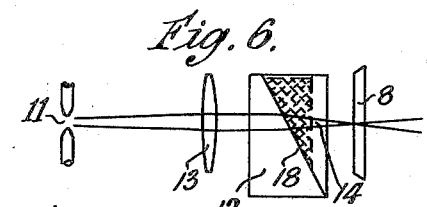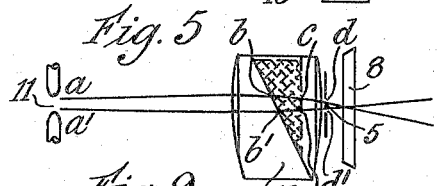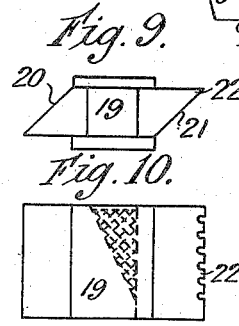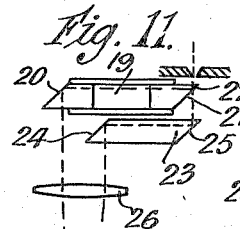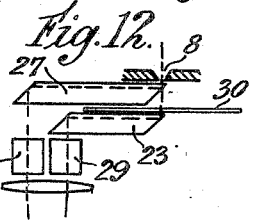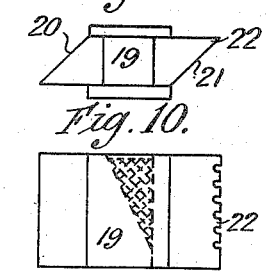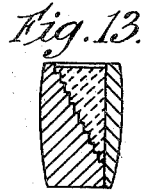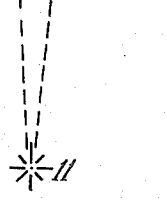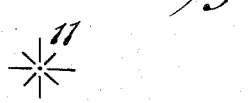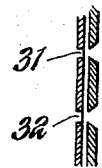

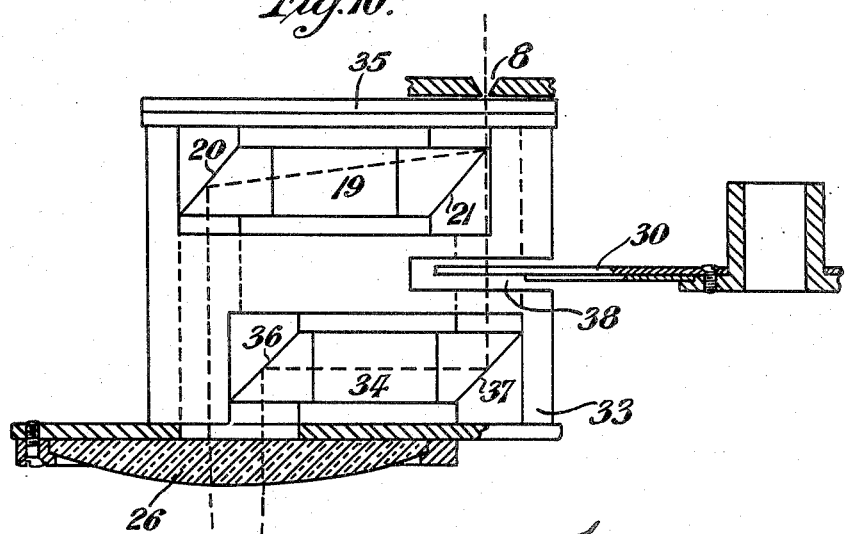
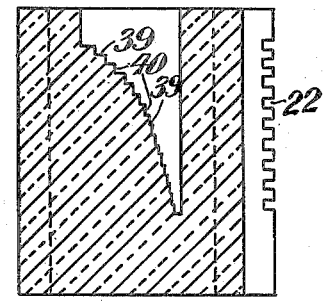
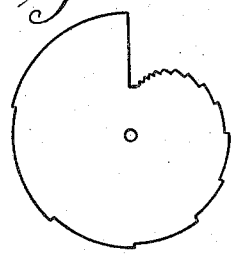
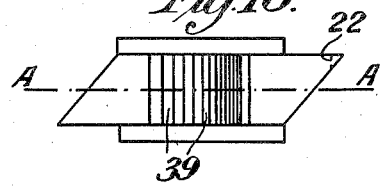
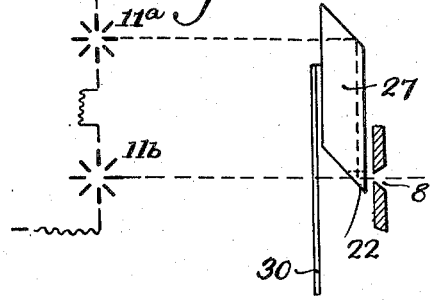

2,126,429

UNITED STATES PATENT OFFICE 2,126,429

DETERMINATION OF QUANTITATIVE CHARACTERISTICS OF RADIATION

Frank Twyman and Leonard Jesse Spencer, London, England, assignors to Adam Hilger Limited, London, England Application May 2, 1932, Serial No. 608,826
In Great Britain December 10, 1931

13 Claims. (Cl. 88—14)

The invention relates to the determination of quantitative characteristics of radiation. Under the term "radiation" we understand not only energy which is customarily regarded as being transmitted by ether vibrations, such as light or X-rays, but corpuscular rays such as positive rays. In the case of radiation which can be defined in terms of wavelength the characteristic to be determined may relate to a singe wavelength, a group of wavelengths or a range of wavelengths such for example as one or more spectrum lines or the whole visible or actinic spectrum. Frequently the determination required will be that of the amount of energy but other characteristics of such radiation which may have to be determined would be for example rotation or other polarization phenomena relating to light or the curtailment of wavelength range of X-rays when passing through a layer of lead. Determinations of the kind envisaged are required in many tests, among which may be mentioned quantitative spectrum analysis where data have to be obtained relating to a source of radiation, and absorption and rotation phenomena where the data required relate to a medium through which the radiation passes. The latter head might include even the passage of electrons through a thin layer of metal.

For the purpose of the invention it is necessary to represent the quantitative characteristic in some manner, preferably visible, which exhibits a constant response to any particular amount of the quantitative characteristic to be determined, but it is by no means necessary for the relation between differing amounts and the response they produce to be known. The representation may for example be a spectrum, a patch of light, or an area of phosphorescence and it may be observed visually or recorded on such a medium as a photographic plate or be otherwise made evident to the senses of the observer.

According to the invention for the determination of a quantitative characteristic of radiation means are provided for producing simultaneously a plurality of representations of the required characteristic differing as to the quantity represented in predetermined steps of gradation, said representations being spaced apart for the placing therebetween of a plurality of representations of the characteristic in standard quantity. These last-named representations need not be all equal; it might be found advisable in some cases for them to represent two, three or more different amounts of the characteristic.

When the problem to be solved is that of comparing two quantities of radiant energy, as in the case of quantitative spectrum analysis or testing the absorption of light filters, the invention will usually be carried out by providing means for producing simultaneously a plurality of representations of one quantity in graded intensities, means for interposing therebetween a plurality of representations of the other quantity in equal intensities and means for observing or recording for comparison purposes the two sets of representations.

In the case of spectrography applied to such questions as those mentioned in the previous paragraph means may be provided for recording by a single exposure on one photographic plate a plurality of spectra of graded intensity and for recording by the same exposure or a second single exposure on the same plate a plurality of reference spectra of equal intensity between the graded spectra.

Various embodiments of the invention are shown in the accompanying drawings in which Figure 1 is a plan and Figure 2 an elevation of a wedge cell for liquids, Figure 3 is a view of a multiple aperture diaphragm, Figure 4 is an elevation showing the cell and diaphragm in relation to the slit of a spectrograph, Figure 5 is an explanatory diagram, Figure 6 shows a combined cell and diaphragm with certain parts of the spectrograph, Figure 7 is part of a protector used in platinizing the cell, Figure 8 is an enlarged view of part of the cell wall after being platinized, Figure 9 is a plan and Figure 10 an elevation of a modified form of cell and diaphragm combination, Figure 11 is a plan showing the same in relation to the slit of a spectrograph, Figure 12 is a plan showing a modified form of apparatus with parallel ended cells and a logarithmic sector, Figure 13 is a sectional elevation of a modified wedge cell, Figure 14 shows a modified sector, Figure 15 shows diagrammatically part of an arrangement for quantitative spectrum analysis, Figure 16 is a plan of an alternative arrangement of wedge cells and sector, Figure 17 is an elevation of a modified wedge cell taken in section on the line A—A of Figure 18, Figure 18 is a plan of the same cell, and Figure 19 is a diagrammatic plan showing a modification of the arrangement shown in Figure 12.

In describing these embodiments it is convenient to consider separately the two functions of producing simultaneously a plurality of representations and of grading these representations in intensity. Separate pieces of apparatus will first be described for carrying out these two functions and then it will be shown how they may both be combined into a single piece of apparatus before considering further modifications.

A convenient means for carrying out grading in the case of such phenomena as the absorption of light is a wedge-shaped member. Where the absorption in a solid has to be studied the solid may be cut into the form of a wedge or if the problem is in connection with the intensity of radiation itself, the grading may be carried out by a tint wedge of predetermined properties. An alternative to the tint wedge is the sector disc which provides along a radial line a gradual variation of the proportion of opening to total circumference. Where the properties of liquids are to be studied a wedge cell may be used in which the liquid is contained. In the case of a wedge cell it is necessary to have accurate data regarding its dimensions.

An improved form of cell may be constructed as shown in Figures 1 and 2, preferably from two pieces of fused silica; the two pieces 1 and 2 are both wedge-shaped and are adhesed together, preferably by the method disclosed in British patent specification No. 103,233, to form a substantially rectangular block. Previous to the adhesion a groove 3 is ground through the piece 1 from top to bottom, this groove then providing in the finished cell an accurately wedge-shaped space which may be filled with any desired liquid.

A further improvement of the cell is provided by grinding its front and rear faces as shown in to form lens surfaces so that the beam of light coming from a light source is collimated by the front face, passes through the cell as parallel light, and is then focused by the rear surface as an image of the light source on the prism aperture of the spectograph, if this is the apparatus with which the cell is to be used. Preferably the optical centre of the lens faces is not central as regards the dimensions of the cell itself, but is central in relation to the dimension from the point of the wedge to the top of the liquid level.

During the manufacture of the cell a protector (not shown) is preferably cemented to the top of the cell to assist in the working of the lens surfaces. This protector can subsequently be used as a neat cap for the cell, particularly when volatile liquids are being investigated.

Means for use in conjunction with a cell of this kind, or with a tint wedge or sample wedge of material for investigation, to provide a plurality of representations of the characteristic may take the form of a multiple aperture diaphragm. A form adapted for use with a spectrograph is shown in Figure 3 and here the diaphragm is provided with two vertical rows of rectangular apertures 4 and 5, the bridge of material between successive apertures being a little wider than the width of each aperture. The two rows of apertures are in staggered relationship so that each aperture in one row is opposite a bridge of the other, but the top edge of each aperture 4 is in line with the bottom edge of an aperture 5, so that the spectra produced are adjacent in pairs with small spaces between the pairs. At the bottom of the row 5 a larger aperture 6 is provided to ensure that the bottom of the wedge is shown in the record which is to be taken. The importance of this is that the thickness of material traversed depends on the dimension from the bottom of the wedge to the centre of the aperture considered. 7 is a finger hole for convenience in shifting the diaphragm to bring one or the other set of apertures into use.

A convenient construction of the diaphragm for spectrography is one having 15 apertures in each row not including the large aperture 6 for the point of the wedge, these apertures being spaced at a pitch of 1 mm. in each row and being .4 mm. wide. The spacing of the spectra obtained would then correspond to a spectrum width of .4 mm. at the diaphragm and spacing between successive pairs of spectra of .2 mm. when both sets are combined. In the record taken it may easily occur that the spacing is not strictly proportional throughout, but this is of no disadvantage if the aperture spacings are uniform as suggested above. With predetermined dimensions the estimation of the thickness of the material traversed will be merely a matter of counting the spectra and estimating or calculating the length represented by the small part indicated through the bottom hole 6.

In another construction of the diaphragm there are 20 apertures in each row, not including the large aperture 6 for the point of the wedge, each aperture being 0.4 mm. wide, the pitch being 0.8 mm., and no space being left between successive pairs of spectra. With this arrangement, one can make each aperture do double duty by seeking for a match at both the top and the bottom of each spectrum, thus increasing the number of possible match points from 15 to 39, with a commensurate increase in the information provided by a single pair of exposures.

Figure 4 shows diagrammatically how the diaphragm and wedge cell should be mounted in relation to the spectrograph. The spectrograph is indicated conventionally by its slit 8, while 9 is the diaphragm placed as close to the slit as possible so that the demarcation between the two spectra forming each pair may be sharp. The wedge cell 10 is placed as close as possible to the diaphragm for reasons which will be made clear hereinafter, and 11 is the source of light.

It will be seen that by the combination of a cell and diaphragm as described a record may be obtained in two exposures which in general requires a dozen or more, without any adjustment of the cell being necessary. Not only does this achieve a saving of time, especially in the case where long exposures are necessary, but it is possible to obtain the records at the various intensities with the substance under investigation in exactly the same condition. This feature is also of importance where the substance is such as changes with time or with submission to radiation, as for example in the case of blood serum. These considerations are also of supreme importance in the case of quantitative spectrum analysis where it is practically impossible to produce successive electrical discharges of exactly the same characteristics. It is even possible by means of a modification described hereinafter to reduce the two exposures to a single one with corresponding advantages.

When the cell and diaphragm above described are used in conjunction as shown in Figure 4 it is advantageous to support the cell in a brass or other mount which is made an integral part of the diaphragm. In one position then the light entering the spectrograph passes through the cell and one set of apertures of the diaphragm. If the diaphragm is slid a few millimetres along, the light then passes to the slit of the spectrograph through the other set of apertures either direct or through the same cell filled with a non-absorbing liquid. There is thus produced on the plate a plurality, say 15, of pairs of spectrograms; the upper one of the successive pairs is graded in intensity by having passed through varying thicknesses of the liquid under investigation, and the lower ones of all the pairs are equal. Examination of the various pairs will show, provided the relative exposures have been correctly chosen, that in every pair there are one or more places where the intensities of the two spectra are the same. When these places have been identified the extinction coefficients for these various wave lengths can be obtained by calculations depending on the dimensions of the cell and the relative times of exposure.

A disadvantage of this procedure in certain cases is that the first exposure may have to be considerably longer than the second, so that to obtain results with the required degree of accuracy requires a knowledge of Schwarzschild's constant, the value of which would appear to vary with make of plate and other considerations. In such cases the time of exposure for the reference spectra may be made equal to the time of exposure for the graded spectra by introducing a medium of known absorption or by moving the source of light further away from the cell. Since the latter expedient will, however, vary the dimensions of the lens surface of the cell required to produce parallel light through it, an alternative form of cell with parallel sides referred to below will usually then be preferable unless only the effective distance of the source of light from the cell is increased by such a device as the Hilger variable intensity quartz condenser. An alternative method is to determine Schwarzschild's constant for the make of plates and other conditions of the investigation. This can readily be done by means of the cell and diaphragm already described, using in the cell a liquid of which the light-absorbing properties are known.

A further source of inaccuracy is introduced by the fact that the light passing through any particular aperture of the diaphragm has passed through varying thicknesses of liquid. This is shown diagrammatically in Figure 5 where the proportions of the figure are distorted to magnify the error. 11 is a source of light of finite magnitude $a$ $a'$ indicated conventionally as an arc, and the extreme rays passing through one aperture 5 of height $d$ $d'$ are shown as $a$ $b$ $c$ $d$ and $a'$ $b'$ $c'$ $d'$. It will be seen that the paths of the various rays through the liquid vary in length between $b$ $c$ and $b'$ $c'$ and where the work is of such a nature that a corresponding correction must be made the mean thickness can be arrived at by mathematical calculations. A modified form of cell now to be described will however so reduce this inaccuracy as to obviate the necessity of such corrections.

This improvement consists essentially in locating the diaphragm on one internal face of the cell and is indicated in Figures 6, 7 and 8. The cell 12 is of similar construction to that previously described, but has flat outer surfaces and a separate condensing lens 13 is accordingly necessary. The half of the cell which is provided with a groove has a coating of platinum applied by means of cathode deposition to the bottom of the groove which forms the wall 14 of the cell. A crenellated protector shown enlarged in Figure 7 is first applied to the surface to protect from the platinum deposit those parts of the wall which are to become in effect the diaphragm apertures. The wall 14 of the cell then appears as shown in Figure 8 where 15 is the platinum deposit and 16 and 17 spaces which constitute the equivalents of the two sets of diaphragm apertures. The platinum is deposited say to a density of not less than 3, that is, such a density that the ratio of the transmitted light to the incident light is not more than $1:10^3$ and the above mentioned process for adhesing the cell "burns in" the platinum which is thenceforth impervious to damage. A film of platinum so produced has been found by experiment to be opaque through the entire visible and ultra-violet spectrum as far as 1850 A.

Solid material in the form of a wedge can be studied in precisely the same manner as that above described for liquid wedges. Often, however, solid material for investigation is in the shape of parallel sided slabs, which may vary in thickness from a fraction of a millimetre to several centimetres; in this case the following modified method may be employed which is also applicable to liquids contained in parallel sided cells.

The substance under examination is placed in front of one set of apertures 4 or 5 and a photograph is taken through it, but with a rotating logarithmic sector also interposed between the source of light and the slit. The purpose of the logarithmic sector is to produce a diminution in intensity of the light reaching the slit, the diminution being a logarithmic function of the distance along the slit from some fixed point.

A second photograph is then taken through the other set of apertures with a shorter exposure, or with the light source at a greater distance but with neither the logarithmic sector nor the absorbing material in the path of the light. If the diaphragm has for example fifteen apertures in each set, fifteen spectrograms are thus obtained which are identical, and these are our comparison standards. The other fifteen spectrograms (taken as described in the previous paragraph) are not identical since the amount of light passing through successive apertures diminishes owing to the interposition of the sector, and owing to the absorption of the substance. Hence we can, by data obtained from direct measurement along the slit from the fixed point, determine the relation between (a) the intensity of the light passing through the substance and the logarithmic sector on to the slit at some point under consideration, and (b) the original intensity of the light emitted by the source.

In precisely the same manner as before we pick out the points in the various pairs of spectra where the intensity is the same, and, if merely a qualitative absorption curve is required without reference to absolute data, it can be plotted direct from the results thus obtained. If on the other hand extinction coefficients are desired they can be calculated from the exposure times, the equation of the logarithmic sector and the thickness of the material under investigation.

An alternative method which suggests itself is one in which the sector is used in one photograph and the absorbing material in the other.

This, however, is not so good as the method described since it means that the "matching" takes place on different portions of the characteristic curve of the photographic plate, whereas in the method we have just described the matching takes place on more or less the same portion of this characteristic curve, at any rate over a range of the spectrum for which the photographic intensity of the light source does not greatly vary.

Some further modifications of the apparatus described above have been devised and these may be found more suitable for particular cases.

One of these modifications is shown in Figures 9, 10 and 11 and is a combination of multiple aperture diaphragm and wedge cell different from that previously described. This combination is constructed as a cell 19 preferably of fused silica, rhomb-shaped in plan and presenting two vertical oblique parallel faces 20, 21 at which internal reflection takes place at an angle of about 90°. The wedge cell is comprised between the two parts carrying these oblique surfaces and is so located that the light passes through the liquid in the cell after undergoing the one reflection and before undergoing the other. The part 19 is thus a rhombic prism with a wedge-shaped recess. The acute edge 22 of the rhombic prism which comes nearest the slit 8 used conventionally to represent a spectrograph has a number of nicks ground in it, so that the light which finally arrives at the slit is that passing through the spaces left between the nicks. A solid rhombic prism 23 of fused silica somewhat shorter between its oblique faces than the cell but otherwise having corresponding dimensions is placed in a corresponding position so that the light reflected twice at its oblique faces 24, 25 will pass through the nicks in the cell prism 19 to the slit 8. On account of its shorter length the entrance face of the solid rhombic prism is offset in relation to that of the cell prism and a condenser 26 is placed in such a position that light from a source 11 is caused to pass equally through both entrance faces. A light reducing arrangement such as a sector disc may be placed in the path of the light passing through the solid prism 23 to ensure that the light passing through the nicks is reduced by a suitable uniform amount in intensity, or a shorter time of exposure may be given than to the light passing through the cell prism 19.

An alternative construction is shown in Figure 12. In this the cell prism 19 is replaced by a solid rhombic prism 27 having nicks in one edge as before and two parallel sided cells 28 and 29 are placed between the respective entrance faces of the two prisms. One of these cells 28 will then contain the liquid to be investigated and the other 29 a non-absorbing liquid, a logarithmic sector 30 or equivalent device being used between the two prisms or in some other suitable location to produce the required gradation of the representations.

A further modification is to construct any of the wedge cells described with its oblique face in steps as shown in Figure 13, thus constituting the equivalent of a series of parallel sided cells. This construction will ensure that each spectrum or other representation taken through the liquid passes through a definite length of liquid which can be determined with precision once and for all. When this construction is used a microphotometer may be used to determine the points at which matching takes place between one spectrum or the like and the other.

A modification equivalent to the last-named may be applied to the logarithmic sector as shown in Figure 14 in which the contour of one side of the opening instead of being a continuous curve is made up of a number of radial lines joined together by arcs of concentric circles.

Although the greater part of the foregoing description has been given in relation to determination of the absorption of light by materials, it is clear that, with possible slight modifications to the apparatus, other phenomena, as referred to in the opening paragraphs of the present specification, may be quantitatively studied. As an example may be mentioned quantitative spectrum analysis of substances. When this work is carried out by means of a logarithmic sector in the ordinary way one of the main difficulties lies in the accurate ascertainment of the length of the lines. Apparatus embodying the matching principle now proposed will overcome this difficulty. The accuracy of the method is not limited by the determination as to which of the spectra or other representations is nearest to the standard but an estimation may be made as to the relative departure of two adjacent such spectra or representations from the reference standard, thus providing for a certain degree of interpolation.

For example a problem that frequently arises in metallurgy is to ascertain quickly the amount of one or more minor ingredients in an alloy (e. g. manganese in steel). The invention could be applied to this problem in the following way:

Two sparks are used equidistant from the slit, one having electrodes of the alloy containing a known percentage of manganese, regarded as standard, but of about twice the content which is regarded as the maximum permissible of the manganese to be sought, the other containing some other known (but less) percentage within the range of interest. Either of these light sources is adapted to be brought into position at will, and they are connected and run in series, as described in British patent specification 320,136. The diaphragm 9, with its two columns of apertures 4, 5, is placed in front of the slit 8.

Close to the diaphragm is put a logarithmic sector in the usual way, and this is used when a photograph is taken with the first spark gap in position.

A photograph is then taken with the other spark gap in position; but with the logarithmic sector removed.

The process being repeated with alloys of other known percentages in place of the second spark gap, data are obtained whence a graph can be drawn connecting the order—and by estimation the fraction of an order—of the spectrum pair where a match is found between the selected line of the substance sought, and the percentage of that substance present.

This graph can then be used to determine, by a similar process, the amount of the constituent present in an unknown specimen substituted at the position of the second spark gap.

By employing an arrangement including a solid rhombic prism like the prism 27 of Figure 12 having nicks in its edge the two photographs can be taken simultaneously. Figure 19 illustrates an arrangement of this kind. The light from one spark 11a is brought to correct location in relation to the slit 8 conventionally representing the spectrograph by the double reflection in the solid rhombic prism 27, the other spark 11b being already correctly positioned so that its light passes through the nicks 22 to the slit 8. A logarithmic sector 30 like that of Figure 12 is placed in the path of light from the spark 11b. Thus the two photographs are taken simultaneously and in this way the three advantages are secured that (a) Fluctuations in the intensity of the spectrum lines due to fluctuations in the current will equally affect both spectra of a pair and thus introduce no error in comparing the spectra.

(b) Time is saved, and (c) The logarithmic sector can remain in one position instead of being removed or replaced between each pair of exposures.

Where the process is one requiring to be repeated very frequently a double slit might be used with advantage as shown in Figure 15. This consists of two slits 31 and 32 at a fixed distance from each other, such that a sutiable line of the ingredient sought is brought into juxtaposition with a suitable line of the main substance, one light source 11 alone being used.

The slit 31 is brought into operation—together with the logarithmic sector—to take a photograph of the line of the main substance; and then the slit 32, without the sector, to take a photograph of the line of the constituent sought.

A description will now be given of a form of apparatus which has been found up to the present to be the most suitable for the investigation of fluids. This form comprises a casing in which two cells and a condenser are mounted. The casing is adapted to be fixed immediately in front of the slit of a spectograph or in a suitable position in relation to any other instrument to be used for determining the quantitative characteristics in question.

The particular construction is shown in Figure 16 and its use will be described in relation to absorption spectro-photometry of liquids, but it will be clear that it may have other fields of usefulness.

The condenser 26, preferably of quartz, is fixed on the cell mounting 33, and on the latter is engraved the correct distance of the light source 11 to suit the focal length of the condenser and the dimensions of the spectrograph employed. The two cells 19 and 34 drop easily into recesses, and the whole mount is attached to a dovetailed plate 35 for attachment to a spectograph indicated conventionally by means of its slit 8. The plate 35 slides into the groove which customarily bears the diaphragm for limiting the length of the slit 8.

An abutting screw with locknut (not shown) is provided whereby the mounting can be permanently set to bring the notches into correct position in front of the slit.

Light from the source 11 is collimated, or approximately so, by the condenser 26 and proceeds by closely neighbouring alternative paths to the first reflecting faces 20 and 36 of the two cells respectively.

The cell 19 nearer the slit contains the absorbing liquid in a wedge-shaped recess, so that the radiation reflected at its face 20 traverses different thicknesses of liquid at different heights. The two reflecting faces 20 and 21 of this cell are parallel, and so inclined that the ray falling on the middle of the face 20 is reflected to the acute edge of the face 21, so that the side of the cell does not interfere with the operative pencils of rays. After passage through the wedge of liquid the rays are reflected by the second reflecting face 21, except where that face has been interrupted by a series of notches ground in its edge as shown in Figure 10.

The second cell 34 is similar to the first, except that it has no notches in the edge, and that the rays which fall on the middle of its first face 36 are reflected to the middle of its second face 37 instead of its edge. This latter cell 34 contains the liquid with which the absorption of the first liquid is to be compared, usually one whose absorption is assumed to be negligible (water or alcohol, for instance) or, if the liquid under test is a solution, the solvent used for that solution.

Thus the radiation transmitted by the cell 34 passes through the notches in the edge of cell 19.

In the path of the beam of light passing through the cell 34 can be placed a device such as a rotating sector 30, the function of which is to reduce the intensity of the beam to a predetermined extent.

The spectrograph thus yields a series of spectra of which every other one exhibits the local absorption due to a different thickness of the solution, while the intermediate spectra are reduced uniformly throughout the spectrum to an intensity bearing at each wavelength a known ratio to the radiation which has passed through the comparison liquid.

At certain wavelengths the spectrum which is cut down by the absorption of the liquid will equal in intensity the neighbouring one whose intensity is known, and for these wavelengths one can therefore easily deduce the "density" of the thickness of absorbing liquid through which the rays have passed which form its spectrum at the point of junction between the pair of spectra.

In a particular construction of apparatus which has been found convenient for certain applications the angle, $\theta$, of the wedge of liquid is such that $\tan \theta = \frac{1}{2}$; thus, on the assumption that all the rays pass horizontally through the cell, the path of the rays through the liquid is $h/2$, where $h$ is the height of the horizontal ray above the bottom of the wedge. It can be shown mathematically that this assumption is admissible.

The notches, of which there are 25, are each 0.367 mm. wide, and separated by 0.367 mm. The bottom of the bottom notch, which corresponds with the top dividing line between spectra, is 2 mm. above the apex of the wedge of liquid, and therefore the rays which emerge there have passed through 1 mm. of liquid. The rays which emerge from the top of the top notch (which corresponds with the bottom dividing line between spectra), have passed through 1.0 cm. of liquid. Thus the thickness in cms., $t$, of liquid traversed by the ray which emerges from the $n$th notch edge from the bottom (corresponding with the $n$th from the top in the photograph) is given by:

(i) $\quad t = 0.1 + 0.0187(n-1)$ the extinction coefficient, $\epsilon$, of the liquid for the match points of adjacent spectra is therefore given by:

(ii) $\quad \epsilon = D/t = D/\{0.1 + 0.0187(n-1)\}$ and so that they can be used for measuring the absorption of 1 cm. of liquid without filling them to the brim, the cells are made amply high, and can thus be easily put in their mounting or removed without spilling. Thus, very little care suffices to ensure that the outsides of the cells are kept from getting wet.

The sector openings (two in number) can be adjusted so that the total opening is from 0.4 to 0.7 of a revolution, enabling densities from 0.155 to 0.398 to be measured. The sector is engraved to read log $m$, where $1/m$ is the fraction of a revolution to which the sector opening is adjusted. It is mounted to rotate on the shaft of a motor at about 175 R. P. M., and under these circumstances it is well established that the engravings will indicate effective densities with close approximation. The sector is mounted on a separate stand, to avoid communication of vibration to the slit, but it is so protected that it can be set in position without any risk of its striking the cell mount while in motion.

Clearly these figures may be modified as required to suit the particular use to which the apparatus is to be put.

An alternative to the rotating sector for cutting down the comparison beam may be provided by a silica plate, cathodically coated with platinum. The deposit is rendered durable by being burnt in. This is mounted in a brass or other suitable frame, and can be inserted in the recess 38 which in the foregoing description was occupied by the sector. A convenient plate for most work has a density of about 0.25–0.35. The density of the plate for various wavelengths can be measured by putting in the cell 19 a solution whose extinction coefficient is known for various wavelengths. Into the cell 34 is put the solvent, and a photograph is taken from which the density of the platinum plate for all parts of the spectrum can be found.

A third method of interposing a known comparison density may be provided by a pile of quartz plates. The number of plates actually used in one form of apparatus is 12. The density of this pile of plates can be calculated from Fresnel's formula for all the desired wavelengths, or measured throughout the spectrum by means of a solution of known extinction coefficient as described above in connection with the platinized plate.

The choice of means selected for reducing the intensity of the comparison beam depends largely on the value of the extinction coefficients to be measured, and the nature of the liquids to be examined. The sector has the great advantage that it passes the same fraction of radiation for all wavelengths, and it may be used advantageously for exposures of 20 seconds or over.

Where shorter exposures are desired—and exposures as short as one second can often be obtained—there is no simple means of ensuring that the exposure corresponds with a number of complete revolutions of the sector, and one of the other devices should then be used. Of these, the pile of plates is the better for the lower range of densities; for higher densities it has the disadvantage that a larger number of plates is required, and not only must they then be kept very clean to avoid scattering of the radiation, but for the same reason care must be taken to see that the polish is very perfect, a condition not always sufficiently assured by casual visual examination. The twelve plates mentioned is about a reasonable number to use as a working maximum.

For higher densities and for exposures of less than 20 seconds, the platinized plate should be used, its density being made whatever is suitable for the research under consideration.

The uniformity of the film of platinum must be tested, and this can be done by taking readings with the plate at various heights. Provision is advantageously made for fixing it at such positions that any part of the plate can be brought opposite any notch edge.

The apparatus may be used in the following manner for the application referred to. The apparatus being in position in front of the slit 8, the light source 11 must be put in the right position. In order to do this, both the cells 19 and 34 are filled with liquid by means of a pipette, care being taken to keep them clean and dry on the outside. The liquid used for setting the light source should have a refractive index not very far different from the one whose absorption is to be measured, as for instance the solvent which is to be used in the comparison beam. The cells are placed in their recesses in the cell mount, the light source 11 set at the correct distance from the condenser 26 (as marked on the mount), and the spark started. The spark should be set on the axis of the condensing lens 26 as nearly as is possible by inspection. Using a wide slit at 8, the observer, on looking in at the right-hand side of the camera towards the prism of the spectrograph, will then see the light source imaged within the aperture of that prism. The camera and spectrograph, being of the usual construction, are not shown in the figure. The light source should then be moved sideways or up and down until its image is central with the prism aperture. The observer can then be sure that the radiation which reaches the spectrum along the two alternative paths (through the absorbing and comparison liquids respectively) is not reduced in intensity by vignetting.

The cells are now removed, cleaned, filled (the one with the absorbing liquid and the other with the comparison liquid), and replaced in their recesses. The sector 30 should now be started if this is the light-reducing means used, a few seconds being allowed for it to get up speed. The slit width is reduced to the desired dimensions and the dark slide with its plate is put in the camera, the shutter opened, the spark started and an exposure given. The plate having been developed, fixed, washed and dried, the observer examines the plate and records his observations from which the required data can be obtained.

For certain applications there are some disadvantages in using the form of cell previously described, of which we will first consider that due to the angle of the wedge being constant.

It will be found that for any chosen density introduced into the comparison beam the apparatus yields match points for extinction coefficients $\epsilon$ which are farther apart as $\epsilon$ gets greater. The effect referred to is illustrated in Figure 5 of a paper on "Rapid spectrophotometry" by the inventors published in the Transactions of the Optical Society, vol. 33, No. 2.

According to a further feature of the present invention one or both sides of the liquid space in the wedge cell are shaped to give a predetermined non-linear relationship between the depth of the liquid and the path of radiation through it.

A form of cell was first sought which would give extinction coefficients uniformly spaced. The form of sloping side of the wedge which will give such an effect is a rectangular hyperbola. To give a thickness of liquid ranging from 0.1 cm. at a point 0.2 cm. from the bottom the form of curve is given by $$t = \frac{0.2}{h + 0.2}$$

where $t$ is the thickness of liquid at depth $h$ from the match point.

It is found however that, for any given wavelength, the variation in the density of the liquid for a single step from the edge where the match takes place to the next higher one varies so as to be (for a comparison density of 0.2) imperceptible at the top of the cell, and several times as great as what is just perceptible at the bottom of the cell.

A better shape of cell therefore is one in which a spectrum line of one of the absorption spectrograms in which a match occurs should in the neighbouring absorption spectrogram show the same want of match no matter at what height of the cell the match point may be.

Here the condition to be fulfilled is that $$\epsilon_l dt/dl = A$$

where $\epsilon_l$ is the extinction coefficient of the absorbing liquid for the match point at height $l$ which may be measured from the bottom of the cell, and $A$ is a constant. If $t_0 = 0.1$ cm. and $t_{max} = 1$ cm., the height of the liquid between the points $t=0.1$ and $t=1$ being 1.8 cm., $A = 1.277D$, (D being the comparison density) so that $$t = 0.1 e^{1.277 l}$$

$t$ being the thickness of the cell at height $l$.

The making of such a cell presents no insuperable difficulty. A machine has been devised by one of the inventors for polishing non-spherical lenses which can be adapted to this purpose, and gives the requisite accuracy. But we find that with the dimensions of the cell given above the deviation due to refraction between the fused silica and liquid may, with certain liquids, and in the top part of the cell, cause an error of important degree.

The cause of the error referred to is the deviation of the rays owing to refraction at the silica-liquid surface.

The maximum and minimum thicknesses of liquid selected throughout (1 cm. and 0.1 cm.) are very convenient, permitting as they do a comprehensive range of extinction coefficients to be measured with the one cell, and we have therefore not been willing to accept as a solution of this difficulty making the cell less thick, although we have examined the possibilities of the cell whose minimum thickness should be 0.1 cm. and maximum 0.5 in a depth range of 1.8 cm.

According to a further feature of the present invention the curved side of the liquid space in the wedge cell is replaced by a stepped surface having steps corresponding in height to the pitch of the notches in the edge and in width to the required difference at each place in adjacent paths through the liquid. Such a cell is shown in Figures 17 and 18.

Preferably each increment of thickness of liquid is proportional to the thickness itself, i. e. the liquid thicknesses are in geometrical progression. In a cell of the preferred dimensions stated above it is convenient to make each thickness of liquid 1.145 times the thickness of the liquid next below it, the "treads" 39 thus being of variable width, but the "risers" 40 are 1 mm. throughout. It has been found that it is unnecessary to have so large a number of notches as was chosen for the cell with straight or evenly stepped sides. 9 notches arranged as described above give 18 edges, at which pairs of spectra due to the comparison and the absorption beams respectively can be composed. Each notch is then 1 mm. wide, and the notches are separated by 1 mm.

What we claim is:

1. Means for producing a plurality of representations of radiation spaced apart comprising a rhombic prism having two pairs of parallel faces set obliquely to each other and a plurality of notches in one acute edge.

2. Means for producing a plurality of graded representations of radiation spaced apart comprising a rhombic prism having two pairs of parallel faces set obliquely to each other and a plurality of notches in one acute edge and provided with a wedge-shaped recess adapted to contain a fluid.

3. Spectrophotometric apparatus comprising spectroscopic apparatus with a slit, a rhombic prism in front thereof with notches cut in its acute edge, two equal spark gaps in series located one to send its light through the rhombic prism with two reflections at parallel faces thereof and the other to send its light through the said notches, and graded light reducing means in the path of the light from one of the sparks only with the variation in light reducing power in a direction substantially parallel to the slit.

4. A device of the character described for the determination of a quantitative characteristic of radiation comprising a spectrograph having a slit, a plurality of spaced reflecting members positioned closely to and along the slit, means for directing a light beam into the slit between said members to form a first set of spaced representations, means for directing a second light beam onto said members and thence into said slit to form a second set of spaced representations, the means for forming one of said sets of representations being adapted to form representations of known intensity, and a wedge cell interposed in the path of one of the said beams adapted to contain a sample of the substance whose characteristic is to be determined and located to present thicknesses of the sample to the radiation passing therethrough which vary along the length of the slit through which said radiation passes.

5. A device of the character described for the determination of a quantitative characteristic of radiation comprising a spectrograph having a slit, a plurality of spaced reflecting members positioned closely to and along the slit, means for directing a light beam into the slit between said members to form a first set of spaced representations, means for directing a second light beam onto said members and thence into said slit to form a second set of spaced representations, the means for forming one of said sets of representations being adapted to form representations of known intensity, and a wedge cell interposed in the path of one of the said beams adapted to contain a sample of the substance whose characteristic is to be determined, the said cell having one of the pair of faces serving as entrance and exit surfaces for the radiation formed in steps having face portions parallel to the other of said pair of faces, but at distances therefrom varying along the length of the slit through which said radiation passes.

6. Means for producing from radiation passing from a source to a recording instrument a plurality of graded representations of radiation spaced apart and a plurality of standard representations of radiation therebetween, comprising two rhombic prisms each having two pairs of parallel faces set obliquely to each other and one of them having a plurality of notches in one acute edge, in which the prisms are assembled together with the longer faces parallel and projecting by acute edges thereof into the path of radiation, the further one from the source of radiation projecting further into said path than the nearer one, so as to reflect the intercepted radiation at the oblique surfaces through the prisms to the opposite oblique surfaces, and in which the notched edge is in the prism further from the source of radiation and at the end of said prism not projecting into the path of radiation, the notched edge being so formed and so positioned as to reflect at the prism surface portions between the notches the radiation passing through the prism and to permit to pass through the notches the radiation similarly reflected out of the other prism.

7. Means for producing from radiation passing from a source to a recording instrument a plurality of graded representations of radiation spaced apart and a plurality of standard representations of radiation therebetween, comprising two rhombic prisms each having two pairs of parallel faces set obliquely to each other and one of them having a plurality of notches in one acute edge, in which the prisms are assembled together with the longer faces parallel and projecting by the acute edges thereof into the path of the radiation, the further one from the source of radiation projecting further into said path than the nearer one, so as to reflect the intercepted radiation at the oblique surfaces through the prisms to the opposite oblique surfaces, and in which the notched edge is in the prism further from the source of radiation and at the end of said prism not projecting into the path of radiation, the notched edge being so formed and so positioned as to reflect at the prism surface portions between the notches the radiation passing through the prism and to permit to pass through the notches the radiation similarly reflected out of the other prism, and both prisms being provided with wedge-shaped recesses adapted to contain fluids.

8. Means for producing from radiation passing from a source to a recording instrument a plurality of graded representations of radiation spaced apart and a plurality of standard representations of radiation therebetween, comprising two rhombic prisms each having two pairs of parallel faces set obliquely to each other and one of them having a plurality of notches in one acute edge, in which the prisms are assembled together with the longer faces parallel and projecting by acute edges thereof into the path of the radiation, the further one from the source of radiation projecting further into said path than the nearer one and having its shorter faces less oblique, so that the intercepted radiation is reflected at the oblique surfaces through both prisms to the opposite oblique surfaces and in the case of the prism further from the source of radiation to a part thereof near the acute edge, and in which the said acute edge is the one having the notches and is so formed and so positioned as to reflect at the prism surface portions between the notches the radiation passing through the prism and to permit to pass through the notches the radiation similarly reflected out of the other prism, and both prisms being provided with wedge-shaped recesses adapted to contain fluids.

9. Means for producing from radiation passing from a source to a recording instrument a plurality of graded representations of radiation spaced apart and a plurality of standard representations of radiation therebetween, comprising two rhombic prisms each having two pairs of parallel faces set obliquely to each other and one of them having a plurality of notches in one acute edge, in which the prisms are assembled together with the longer faces parallel and projecting by acute edges thereof into the path of the radiation, the further one from the source of radiation projecting further into said path than the nearer one, so as to reflect the intercepted radiation at the oblique surfaces through the prisms to the opposite oblique surfaces, and in which the notched edge is in the prism further from the source of radiation and at the end of said prism not projecting into the path of radiation, the notched edge being so formed and so positioned as to reflect at the prism surface portions between the notches the radiation passing through the prism and to permit to pass through the notches the radiation similarly reflected out of the other prism, in combination with a radially graded rotating sector in the path of the radiation between the notched edge and the adjacent edge of the other prism.

10. In a means for producing a plurality of graded representations from radiation passing from a source to a recording instrument, a wedge cell adapted to contain a fluid, in which one of the pair of faces of the fluid space serving as entrance and exit surfaces for the radiation passing through the fluid is formed in steps having face portions parallel to the other of said pair of faces but at progressively varying distances therefrom.

11. In a means for producing a plurality of graded representations from radiation passing from a source to a recording instrument, a wedge cell adapted to contain a fluid, in which one of the pair of faces of the fluid space serving as entrance and exit surfaces for the radiation passing through the fluid is formed in steps having face portions parallel to the other of said pair of faces but at progressively varying distances therefrom, and in which the differences in path length through the fluid between successive steps also vary progressively.

12. In a means for producing a plurality of graded representations from radiation passing from a source to a recording instrument, a wedge cell adapted to contain a fluid, in which one of the pair of faces of the fluid space serving as entrance and exit surfaces for the radiation passing through the fluid is formed in steps having face portions parallel to the other of said pair of faces but at progressively varying distances therefrom, such that the lengths of path through the fluid vary in geometrical progression.

13. Means for producing from radiation passing from a source to a recording instrument a plurality of graded representations of radiation spaced apart and a plurality of standard representations of radiation therebetween, comprising two rhombic prisms each having two pairs of parallel faces set obliquely to each other and one of them having a plurality of notches in one acute edge, in which the prisms are assembled together with the longer faces parallel and projecting by acute edges thereof into the path of the radiation, the further one from the source of radiation projecting further into said path than the nearer one, so as to reflect the intercepted radiation at the oblique surfaces through the prisms to the opposite oblique surfaces, and in which the notched edge is in the prism further from the source of radiation and at the end of said prism not projecting into the path of radiation, the notched edge being so formed and so positioned as to reflect at the prism surface portions between the notches the radiation passing through the prism and to permit to pass through the notches the radiation similarly reflected out of the other prism, and both prisms being provided with recesses adapted to contain fluids in which one of the pair of faces in each recess which serve as entrance and exit surfaces for the radiation passing through the fluid is formed in steps having face portions parallel to the other of said pair of faces and at distances therefrom varying in geometrical progression.

FRANK TWYMAN.
      LEONARD JESSE SPENCER.